US012609721B2

(12) United States Patent
Shen

(10) Patent No.: US 12,609,721 B2
(45) Date of Patent: Apr. 21, 2026

(54) ISOLATION PROVISION FROM MULTIPLE ANTENNAS TO A SINGLE ANTENNA

(71) Applicant: Qorvo US, Inc., Greensboro, NC (US)

(72) Inventor: Yilong Shen, Nijmegen (NL)

(73) Assignee: Qorvo US, Inc., Greensboro, NC (US)

( * ) Notice: Subject to any disclaimer, the term of this patent is extended or adjusted under 35 U.S.C. 154(b) by 358 days.

(21) Appl. No.: 18/279,085

(22) PCT Filed: Mar. 4, 2022

(86) PCT No.: PCT/US2022/018876
§ 371 (c)(1),
(2) Date: Aug. 28, 2023

(87) PCT Pub. No.: WO2022/187601
PCT Pub. Date: Sep. 9, 2022

(65) Prior Publication Data
US 2024/0146345 A1 May 2, 2024

Related U.S. Application Data

(60) Provisional application No. 63/157,076, filed on Mar. 5, 2021.

(51) Int. Cl.
*H04B 1/18* (2006.01)
*H04B 1/04* (2006.01)
*H04B 1/525* (2015.01)

(52) U.S. Cl.
CPC ............. *H04B 1/0458* (2013.01); *H04B 1/18* (2013.01); *H04B 1/525* (2013.01)

(58) Field of Classification Search
CPC ...... H04B 1/0458; H04B 1/0475; H04B 1/10; H04B 1/16; H04B 1/18; H04B 1/40;
(Continued)

(56) References Cited

U.S. PATENT DOCUMENTS

| 8,767,869 | B2 * | 7/2014 | Rimini | .................. | H04B 1/525 |
| | | | | | 455/101 |
| 9,641,205 | B1 | 5/2017 | Hyun et al. | | |

(Continued)

OTHER PUBLICATIONS

Notice of Allowance for U.S. Appl. No. 17/371,670, mailed Sep. 20, 2023, 7 pages.
(Continued)

*Primary Examiner* — Quochien B Vuong
(74) *Attorney, Agent, or Firm* — Withrow & Terranova, P.L.L.C.

(57) ABSTRACT

A directional coupler is operably connected to each antenna of a transmitting transceiver that has multiple antennas, and a tunable load is operably connected to each directional coupler. The directional couplers act to couple a co-located receiving transceiver to the antennas of the transmitting transceiver. Each tunable load is constructed based on a reflection coefficient ($\Gamma$) that is determined for that tunable load, in that the type of components and/or the values of some or all of the components that are used in the tunable load are determined based on the reflection coefficient ($\Gamma$) associated with that tunable load. The tunable loads cancel or reduce interferences experienced by the co-located receiving transceiver when the transmitting transceiver is transmitting using at least one of the multiple antennas.

24 Claims, 6 Drawing Sheets

(58) Field of Classification Search

CPC . H04B 1/44; H04B 1/525; H01Q 1/52; H01Q 1/521; H01Q 1/525

See application file for complete search history.

(56) References Cited

U.S. PATENT DOCUMENTS

| | | | |
|---|---|---|---|
| 10,014,963 | B2 * | 7/2018 | Su ......................... H01Q 1/521 |
| 10,581,155 | B1 | 3/2020 | Gradinaru et al. |
| 10,938,369 | B1 | 3/2021 | Gradinaru |
| 11,121,693 | B1 | 9/2021 | Labadie et al. |
| 11,139,568 | B2 | 10/2021 | Olesen et al. |
| 11,258,473 | B2 * | 2/2022 | Luo ......................... H04B 1/10 |
| 11,265,052 | B1 * | 3/2022 | Proejts .................... H04B 1/44 |
| 11,901,620 | B2 | 2/2024 | Shen |
| 2012/0195351 | A1 | 8/2012 | Banwell et al. |
| 2018/0294540 | A1 | 10/2018 | Cheng et al. |
| 2019/0207633 | A1 | 7/2019 | Huusari et al. |
| 2020/0067606 | A1 | 2/2020 | Raghavan |
| 2020/0119440 | A1 | 4/2020 | Paulsen et al. |
| 2020/0161755 | A1 | 5/2020 | Olesen et al. |
| 2021/0218430 | A1 | 7/2021 | Han et al. |
| 2021/0344096 | A1 | 11/2021 | Seki et al. |
| 2022/0013897 | A1 | 1/2022 | Shen |
| 2022/0029285 | A1 | 1/2022 | Svendsen et al. |
| 2024/0146345 | A1 | 5/2024 | Shen |

OTHER PUBLICATIONS

Charalampou et al. "Experimenting on LTE-U and WiFi coexistence" 2019 4th South-East Europe Design Automation, Computer Engineering, Computer Networks and Social Media Conference (SEEDA-CECNSM), 2019, 6 pages.

Chen et al. "A Decoupling Technique for Increasing the Port Isolation Between Two Strongly Coupled Antennas" IEEE Transactions on Antennas and Propagation, vol. 56, No. 12, Dec. 2008, pp. 3650-3658.

Da Ponte et al. "CASH: A Channel Assigner Algorithm for Heterogeneous Devices in Smart Homes" 2019 IFIP/IEEE Symposium on Integrated Network and Service Management (IM), 2019, pp. 624-628.

Hong et al. "Applications of Self-Interference Cancellation in 5G and Beyond" IEEE Communications Magazine, vol. 52, No. 2, 2014, pp. 114-121.

Jain et al. "Enabling In-Band Coexistence of Millimeter-Wave Communication and Radar" 2020 IEEE International Radar Conference (RADAR), 2020, pp. 772-777.

Jasteh, Donya "Isolation Enhancement in a Dual Port Antenna" Thesis, The University of Birmingham, Master of Philosophy (MPhil), Oct. 2011, 109 pages.

Kim et al. "A Passive Circulator for RFID Application with High Isolation using a Directional Coupler" Proceedings of the 36th European Microwave Conference, Sep. 2006, Manchester UK, pp. 196-199.

Kumu Networks "K4051 Canceller Reference Board" K4051 Canceller Product Brief, Apr. 2020, www.kumunetworks.com, 2 pages.

Neburka et al. "Study of the Coexistence between ZigBee and Wi-Fi IEEE 802.11b/g Networks in the ISM Band" 2015 25th International Conference Radioelektronika (Radioelektronika), 2015, 4 pages.

Polak et al. "LTE and LoRa in the 2.4 GHz Band: Adjacent Channel Interference Issues" 2020 30th International Conference Radioelektronika (Radioelektronika), 2020, 4 pages.

Non-Final Office Action for U.S. Appl. No. 17/371,670, mailed Jul. 6, 2023, 14 pages.

International Search Report and Written Opinion for International Patent Application No. PCT/US2022/018876, mailed Jul. 5, 2022, 14 pages.

* cited by examiner

ISOLATION PROVISION FROM MULTIPLE ANTENNAS TO A SINGLE ANTENNA

RELATED APPLICATIONS

This application is a 35 USC 371 national phase filing of International Application No. PCT/US2022/018876, filed Mar. 4, 2022, which claims the benefit of U.S. provisional patent application Ser. No. 63/157,076, filed Mar. 5, 2021, the disclosures of which are incorporated herein by reference in their entireties.

FIELD OF THE DISCLOSURE

The technology of the disclosure relates generally to mitigating interference from co-located antennas in a device supporting one or more wireless technologies.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

Many mobile communication devices support multiple transceivers that may operate according to different wireless technologies. For example, it is common for a smart phone to include a WI-FI transceiver, a BLUETOOTH transceiver (including modern variants such as BLUETOOTH Low Energy (BLE)), a ZIGBEE transceiver, a cellular transceiver, and the like. While the presence of these multiple transceivers increases the versatility and functionality of the mobile communication device, the multiple transceivers can create problems for one another.

Specifically, the antennas associated with these transceivers must necessarily be located proximate to one another given the limited real estate of the mobile communication device. When the antennas are proximate to one another, a signal being transmitted from one antenna may couple to a proximate antenna, which can cause interference with signals being received by the proximate antenna.

SUMMARY

Example aspects of the present disclosure reduce and potentially eliminate the interferences at a receiving transceiver through directional couplers that are operably connected to multiple antennas of a co-located transmitting transceiver, and through tunable loads that are operably connected to the directional couplers. The directional couplers act to couple the receiving transceiver to the multiple antennas of the co-located transmitting transceiver. Each directional coupler isolates a transmitted signal away from the receiving transceiver while still allowing the receiving transceiver to receive an intended signal. Additionally, each tunable load is constructed based on a reflection coefficient (Γ) that is determined for that tunable load. The "construction" of the tunable load refers to the type and/or the value of some or all of the components in the tunable load. The tunable loads cancel or reduce interferences that are experienced by the receiving transmitter when the co-located transmitting transceiver is transmitting one or more signals using any number of the multiple antennas.

In one aspect, a device includes a first transceiver and second transceiver that are proximate or co-located to one another. A first directional coupler is operably connected to the first transceiver. A first antenna and a first tunable load are operably connected to the first directional coupler. A second directional coupler is operably connected to the first transceiver. A second antenna and a second tunable load are operably connected to the second directional coupler. The second transceiver is operably connected to the first directional coupler and to the second directional coupler. The first tunable load and the second tunable load are tuned to at least reduce (e.g., reduce or cancel) interferences that are incurred by the transmission of signals on the first and/or on the second antennas.

In another aspect, a system includes a first transceiver and a second transceiver, with the first transceiver proximate or co-located to the second transceiver. A first directional coupler is operably connected to the first transceiver. A first antenna and a first tunable load are operably connected to the first directional coupler. A second directional coupler is operably connected to the first transceiver. A second antenna and a second tunable load are operably connected to the second directional coupler. A power combiner circuit is operably connected between the second transceiver and the first and the second directional couplers. The first tunable load and the second tunable load are tuned to at least reduce (e.g., reduce or cancel) interferences that are incurred by the transmission of signals on the first antenna and/or on the second antenna.

In yet another aspect, a method includes detecting an amount of reduction of interferences at a first transceiver, where the interferences are incurred by a transmission of one or more signals at a second transceiver that is co-located to the first transceiver. A determination is made as to whether the amount of the reduction of interferences is changed. Based on a determination that the amount of the reduction of interferences has changed, a variable load is adjusted to change a net interference input into the first transceiver. The variable load is operably connected to a directional coupler, and the directional coupler is operably connected to the first and the second transceivers.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
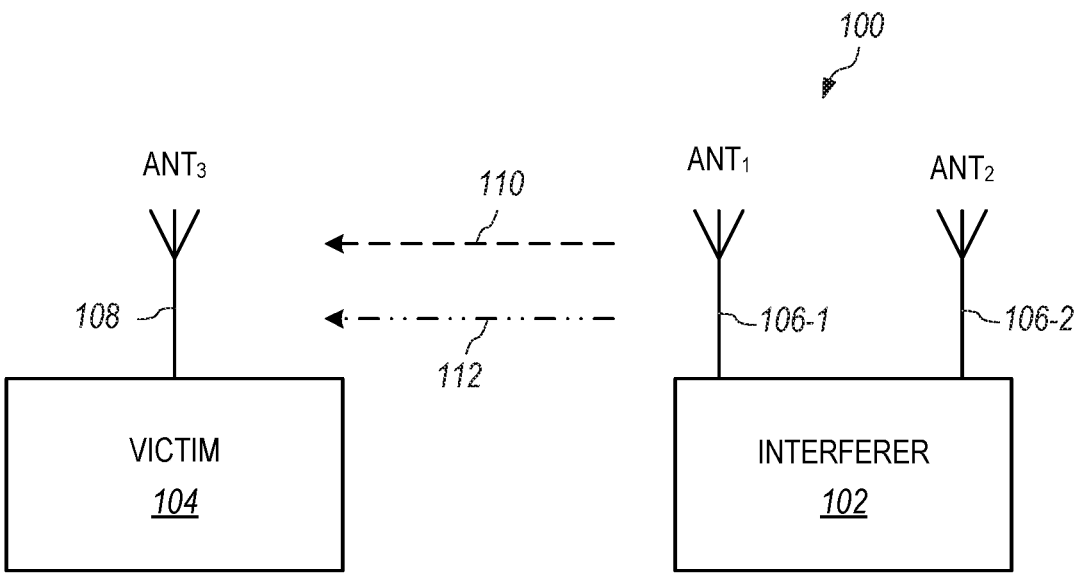
FIG. 1 illustrates a block diagram of a device with two co-located transceivers.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected", "operably connected", "coupled" or "operably coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

FIG. 1 illustrates a block diagram of a device 100 that includes a first transceiver 102 and a co-located second transceiver 104. In the example device 100, the first transceiver 102 is a multiple-input and multiple-output (MIMO) transceiver. For example, the first transceiver 102 may be a WI-FI transceiver and the second transceiver 104 may be a BLUETOOTH transceiver. In some situations, the first transceiver 102 can be only a transmitter operable to transmit signals and the second transceiver 104 can be only a receiver that receives signals. In another instances, both the first transceiver 102 and the second transceiver 104 receive and transmit signals using multiple wireless technologies. Example wireless technologies include, but are not limited to, WI-FI, BLUETOOTH, near-field communication (NFC), ZIGBEE, local area network (LAN), and wireless local area network (WLAN).

The first transceiver 102 is operably connected to multiple antennas 106-1, . . . , 106-N, where N is equal to or greater than two. In the example embodiment, the first transceiver 102 is operably connected to a first antenna 106-1 ($ANT_1$) and to a second antenna 106-2 ($ANT_2$). Similarly, the second transceiver 104 is operably connected to a third antenna 108 ($ANT_3$).

The first and the second transceivers 102, 104 are proximate to one another, also known as co-located. In one non-limiting nonexclusive embodiment, the first transceiver 102 is separated from the second transceiver 104 by approximately one to two centimeters. In some instances, the first and the second transceivers 102, 104 are disposed on the same printed circuit board.

Because the first and the second transceivers 102, 104 are co-located, transmissions from the first transceiver 102 through the first antenna 106-1 may radiate outward from the first antenna 106-1 and impinge on the third antenna 108 as illustrated by antenna coupling 110. Similarly, transmissions from the first transceiver 102 through the second antenna 106-2 may radiate outward from the second antenna 106-2 and impinge on the third antenna 108 as illustrated by antenna coupling 112. As a function of the antenna coupling 110 and/or the antenna coupling 112, signal transmissions from the first transceiver 102 can interfere with signal reception at the second transceiver 104. For example, if the second transceiver 104 is receiving a signal on the third antenna 108 while the first transceiver 102 is transmitting a signal on the first antenna 106-1, or on both the first and the second antennas 106-1, 106-2 (e.g., in a MIMO transceiver), interference from the first antenna 106-1 can adversely affect the signal quality of the signal received on the third antenna 108. For example, the signal-to-interference ratio of the received signal at the second transceiver 104 may decrease as a result of the interference. Thus, the first transceiver 102 may be referred to as "interferer" and the second transceiver 104 as "victim."

Embodiments disclosed herein reduce and potentially eliminate interference at the second transceiver (the victim) through the use of directional couplers and tunable loads. A directional coupler is added to each of the multiple antennas of the first transceiver (the interferer). Each directional coupler acts to operably connect the second transceiver (the victim) to the multiple antennas of the first transceiver (the interferer). This arrangement enables the second transceiver (the victim) to receive signals through the multiple antennas of the first transceiver. Each directional coupler assists in isolating a transmitted interference signal away from the second transceiver (the victim) while still allowing the second transceiver (the victim) to receive the signal intended for the second transceiver.

Additionally, tunable loads are operably connected to the directional couplers. The construction of each tunable load is based on a reflection coefficient ($\Gamma$) that is determined for that tunable load. The "construction" of the tunable load refers to the type and/or the value of some or all of the components that are used to assemble the tunable load. The load is considered "tunable" because the construction of the load is "tuned" to reduce or cancel interferences from the first transceiver (the interferer) when the first transceiver is transmitting. Based on the determined $\Gamma$s for the tunable loads, each tunable load reflects a portion of the transmitted interferences so that the net interference as seen by the second transceiver (the victim) is reduced or cancelled.

Thus, in embodiments of the present disclosure, an antenna port at the second transceiver shares all of the multiple antennas of the first transceiver, which enables interferences generated by the first transceiver (the interferer) to be suppressed (as experienced by the second transceiver (the victim)) while the first transceiver (the interferer) is transmitting. By reducing a magnitude of interferences from the first transceiver (the interferer) as seen by the second transceiver (the victim), the signals received by the second transceiver (the victim) may have better signal quality (e.g., a higher signal-to-interference ratio) compared to the signal quality of the signals received by the second transceiver 104 of FIG. 1.

Figure 2:
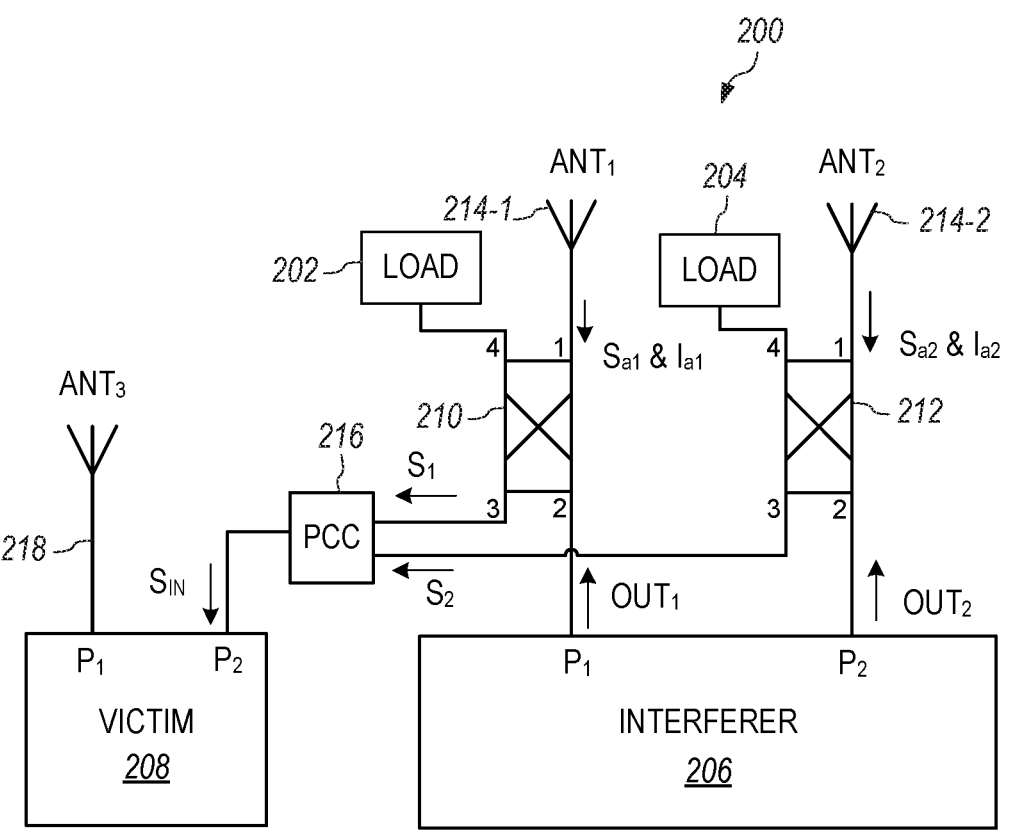
FIG. 2 illustrates a block diagram of a first device that includes a first transceiver that operates with multiple antennas and includes directional couplers and tunable loads to mitigate interference experienced by a co-located second transceiver.

FIG. 2 illustrates a block diagram of a first device 200 that includes first and second directional couplers 210, 212 and first and second tunable loads 202, 204 to mitigate interference experienced by a co-located second transceiver 208 (the victim). FIG. 2 is described in conjunction with a first transceiver 206 (the interferer) transmitting a signal while the second transceiver 208 (the victim) is receiving a signal from a different transmitter.

The example device 200 includes the first directional coupler 210 operably connected to a first antenna port ($P_1$) of the first transceiver 206 (the interferer) and the second directional coupler 212 operably connected to a second antenna port ($P_2$) of the first transceiver 206 (the interferer). The first and the second directional couplers 210, 212 each have four ports 1, 2, 3, 4. For the first directional coupler 210, port 2 is operably connected to the first antenna port ($P_1$) of the first transceiver 206 (the interferer), port 1 is operably connected to a first antenna 214-1, port 4 is operably connected to the first tunable load 202, and port 3 is operably connected to a first input of a power combiner circuit (PCC) 216. For the second directional coupler 212, port 2 is operably connected to the second antenna port ($P_2$) of the first transceiver 206 (the interferer), port 1 is operably connected to a second antenna 214-2, port 4 is operably connected to the second tunable load 204, and port 3 is operably connected to a second input of the power combiner circuit 216.

An output of the power combiner circuit 216 is operably connected to a second antenna port ($P_2$) of the second transceiver 208 (the victim). A third antenna 218 is operably connected to a first antenna port ($P_1$) of the second transceiver 208 (the victim). Generally, the second transceiver 208 (the victim) transmits signals using the third antenna 218 because the third antenna 218 is a dedicated antenna. Transmissions on the third antenna 218 are not subject to insertion losses that are caused by the first and the second directional couplers 210, 212.

The second transceiver 208 (the victim) typically receives signals on the third antenna 218 when the first transceiver 206 (the interferer) is not transmitting, but embodiments are not limited to this implementation. As will be described in more detail later, the second transceiver 208 (the victim) may be operable to select to receive a signal from the antenna port $P_1$ that is associated with the third antenna 218 or from the antenna port $P_2$ that is associated with the power combiner circuit 216 (e.g., when the first transceiver 206 is transmitting).

In some embodiments, the first and the second directional couplers 210, 212, the first tunable load 202, the second tunable load 204, the power combiner circuit 216, and the first and the second transceivers 206, 208 are all located on the same printed circuit board. In other embodiments, one or more of the first and the second directional couplers 210, 212, the first tunable load 202, the second tunable load 204, and the power combiner circuit 216 are located elsewhere. For example, one or more of the first and the second directional couplers 210, 212, the first tunable load 202, the second tunable load 204, and the power combiner circuit 216 may be located within the first and/or the second transceivers 206, 208.

When an interference $OUT_1$ is transmitted from the first antenna port $P_1$ of the first transceiver 206 (the interferer), $OUT_1$ is received at port 2 of the first directional coupler 210 and input into the first antenna 214-1. $OUT_1$ then radiates out from the first antenna 214-1 and is received by the second antenna 214-2 and by the third antenna 218. A signal $Sa_1$ that is aiming at the second transceiver 208 (the victim) can be picked up by the first antenna 214-1, along with interference $Ia_1$ that is a part of $OUT_1$ that is reflected back by the first antenna 214-1, and input into port 1 of the first directional coupler 210. The signals $Sa_1$ and $Ia_1$ are coupled to port 3 of the first directional coupler 210. Another part of $OUT_1$ that is coupled from port 2 to port 4 of the first directional coupler 210 is reflected by the first tunable load 202 and feeds into port 3 of the first directional coupler 210. Yet another part of $OUT_1$ leaks directly from port 2 to port 3 of the first directional coupler 210. A first input of the power combiner circuit 216 is operably connected to port 3 of the first directional coupler 210. The first tunable load 202 is selected such that the net interference due to $OUT_1$ and input into antenna port $P_2$ of the second transceiver 208 (the victim) is reduced or cancelled.

Similarly, when an interference $OUT_2$ is transmitted from the antenna port $P_2$ of the first transceiver 206 (the interferer), $OUT_2$ is received at port 2 of the second directional coupler 212 and input into the second antenna 214-2. $OUT_2$ then radiates out from the second antenna 214-2 and is received by the first antenna 214-1 and by the third antenna 218. A signal $Sa_2$ that is aiming at the second transceiver 208 (the victim) can be picked up by the second antenna 214-2, along with interference lag that is the part of $OUT_2$ that is reflected back by the second antenna 214-2, and input into port 1 of the second directional coupler 212 and coupled to port 3 of the second directional coupler 212. Another part of $OUT_2$ that is coupled from port 2 to port 4 of the second directional coupler 212 is reflected by the second tunable load 204 and feeds into port 3 of the second directional coupler 212. Yet another part of $OUT_2$ leaks directly from port 2 to port 3 of the second directional coupler 212. A second input of the power combiner circuit 216 is operably connected to port 3 of the second directional coupler 212. The second tunable load 204 is selected such that the net interference due to $OUT_2$ and input into antenna port $P_2$ of the second transceiver 208 (the victim) is reduced or cancelled.

In general and briefly, a reflection coefficient ($\Gamma$) is determined for each of the tunable loads that are operably connected to the directional couplers, where the directional couplers are operably connected to the transmitting transceiver (e.g., the first transceiver 206 in FIG. 2). A respective reflection coefficient ($\Gamma$) is then used to determine the construction of the tunable load associated with that reflection coefficient ($\Gamma$). The construction of each tunable load is "tuned" to reduce or cancel the interferences as seen from the receiving transceiver (e.g., the second transceiver 208 in FIG. 2). In some embodiments, the tunable loads are configured as variable loads that are selectively adjusted to change an amount of interference(s) that is cancelled or reduced. A general discussion of an example determination for one reflection coefficient ($\Gamma$) is described first. Those skilled in the art will recognize that the determination of the reflection coefficient ($\Gamma$) for the other tunable loads in a device is similar. Thereafter, an example determination of the reflection coefficients ($\Gamma$) for the tunable loads 202, 204 in the device 200 of FIG. 2 is described.

A signal ($S_{IN}$) is input into the antenna port of the receiving transceiver that is operably connected to the power combiner circuit. The signal $S_{IN}$ contains a combination of signals that are picked up by the multiple antennas of the first transceiver 206 (the interferer). The signal $S_{ai}$ denotes a signal that is aiming at the second transceiver (the victim) and is picked up by the $(i)^{th}$ antenna of the first transceiver (the interferer). The signal $S_{ai}$ transmits through the directional coupler (i) from port 1 of the directional coupler (i) to port 3 of the directional coupler (i). Based on this, in general, the signal $S_{IN}$ can be defined as:

$$S_{IN} = \text{Sum}_{i=1,\ldots n}(S_{ai}) * C_{31}, \qquad \text{Equation 1}$$

where $C_{31}$ represents the transfer coefficient from port 1 to port 3 in each directional coupler. Equation 1 assumes each directional coupler has the same $C_{31}$. $S_i$ denotes the input to the (i)th input port of the power combiner circuit. In addition to the wanted signal, $S_i$ also contains interferences due to the interferences $Out_i$ and $Out_j$ (j=1, 2, . . . , n and j≠i).

$Out_i\_S_i$ is the part of the interference $Out_i$ that transmits from port (i) in the transmitting transceiver (the interferer) and feeds from port 2 of the directional coupler to the input (i) of the power combiner circuit via multiple paths but without radiating from antenna (i). The signal $Out_i\_S_i$ can be defined by Equation 2.

$$Out_i\_S_i = Out_i * (C_{32\_i} + C_{42\_i} * \Gamma_i * C_{34\_i} + C_{12\_i} * \Gamma_{Anti} * C_{31\_i}) \text{ for } i=1,\ldots,n, \qquad \text{Equation 2}$$

where: $Out_i$ represents the interference output from port (i) of the transmitting transceiver; $C_{32\_i}$ represents the transfer coefficient from port 2 to port 3 of the directional coupler (i); $C_{42\_i}$ represents the transfer coefficient from port 2 to port 4 of the directional coupler (i); $\Gamma_i$ represents the reflection coefficient of the tunable load operably connected to port 4 of the directional coupler (i); $C_{34\_i}$ represents the transfer coefficient from port 4 to port 3 of the directional coupler (i); $C_{12\_i}$ represents the transfer coefficient from port 2 to port 1 of the directional coupler (i); $\Gamma_{Anti}$ represents the reflection coefficient of the antenna (i); and $C_{31\_i}$ represents the transfer coefficient from port 1 to port 3 of the directional coupler (i).

$Out_i\_S_j$ is the part of the interference $Out_i$ that transmits from antenna port (i) in the transmitting transceiver (the interferer), feeds from port 2 of the directional coupler (i) to the antenna port of antenna (i), radiates through the air to antenna (j), couples through port 1 to port 3 of the directional coupler (j), and is input into input (j) of the power combiner circuit 216. $Out_i\_S_j$ can be defined by Equation 3.

$$Out_i\_S_j = Out_i * C_{12\_j} * C_{Ant\_ij} * C_{31\_j}(j=1,2,\ldots n \text{ and } j \neq i), \qquad \text{Equation 3}$$

where: $C_{12\_j}$ represents the transfer coefficient from port 2 to port 1 of the directional coupler (i); $C_{Ant\_ij}$ represents the coupling coefficient between antenna (i) ($Ant_i$) and antenna (j) ($Ant_j$); and $C_{31\_j}$ represents the transfer coefficient from port 1 to port 3 of the directional coupler (j).

The interference that is incurred by the transmission of $Out_i$ and input into the receiving transceiver can be written as:

$$\text{Interference\_Out}_i = \text{Sum}_{j=1,2,\ldots,n}(Out_i\_S_j), \qquad \text{Equation 4}$$

Equation 4 can be rewritten as:

$$\text{Interference\_Out}_i = \text{Sum}_{j=1,2,\ldots,n,j \neq i}(Out_i\_S_j) + Out_i\_S_i, \qquad \text{Equation 5}$$

Equation 5 can be rewritten as:

$$Interference\_Out_i = Out_i {}^*C_{12\_i} {}^*Sum_{j=1,2,\ldots,n,j\neq i}$$
$$(C_{31\_j} {}^*C_{Ant\_ij}) + Out_i {}^*(C_{32\_i} + C_{42\_i} {}^*\Gamma_i {}^*C_{34\_i} +$$
$$C_{12\_i} {}^*\Gamma_{Anti} {}^*C_{31\_i}) \qquad\qquad\text{Equation 6}$$

Equation 6 can be solved for $\Gamma_i$ by setting the value of Interference_Out$_i$ to zero (0). As discussed earlier, $\Gamma_i$ is the reflection coefficient for the tunable load that is operably connected to port 4 of the directional coupler (i). Equation 7 shows the equation for $\Gamma_i$.

$$\Gamma_i = \frac{-1}{C_{42\_i} {}^*C_{34\_i}} (C_{32\_i} + C_{12\_i} {}^*\Gamma_{Anti} {}^* \qquad\qquad\text{Equation 7}$$

$$C_{31\_i} + C_{12\_i} {}^*Sum\; j = 1, 2, \ldots, n,\, j \neq i (C_{31\_j} {}^*C_{Ant\_ij}))$$

When $\Gamma_i$ is determined using Equation 7, the interference from antenna (i) is reduced or cancelled. When it is assumed that all directional couplers in the device have the same coupling coefficient $C_{ij}$, Equation 7 can be rewritten as:

$$\Gamma_i = -(C_{12} {}^*C_{31} {}^*Sum_{j=1,2,\ldots,n,j\neq i}(C_{Ant\_ij}) + C_{32} +$$
$$C_{12} {}^*\Gamma_{Anti} {}^*C_{31}) / (C_{42} {}^*C_{34}) \text{ for } i=1,\ldots,n \qquad\text{Equation 8}$$

With reference now to FIG. 2, an example determination for $\Gamma_i$ for the first tunable load 202 and an example determination for $\Gamma_2$ for the second tunable load 204 is now discussed. For the first tunable load 202, Equation 4 can be written as follows:

$$Interference\_Out_1 = Out_1\_S_1 + Out_1\_S_2 \qquad\text{Equation 9}$$

For the second tunable load 204, Equation 4 can be written as:

$$Interference\_Out_2 = Out_2\_S_2 + Out_2\_S_1 \qquad\text{Equation 10}$$

Assuming the first directional coupler 210 and the second directional coupler 212 are the same, $\Gamma_1$ for the first tunable load 202 is determined using Equation 11 and $\Gamma_2$ for the second tunable load 204 is determined using Equation 12.

$$\Gamma_1 = -(C_{12} {}^*C_{31} {}^*C_{Ant\_12} + C_{32} + C_{12} {}^*\Gamma_{Ant1} {}^*C_{31}) /$$
$$(C_{42} {}^*C_{34}) \qquad\qquad\text{Equation 11}$$

$$\Gamma_2 = -(C_{12} {}^*C_{31} {}^*C_{Ant\_21}) + C_{32} + C_{12} {}^*\Gamma_{Ant2} {}^*C_{31}) /$$
$$(C_{42} {}^*C_{34}) \qquad\qquad\text{Equation 12}$$

When $\Gamma_1$ of the first tunable load 202 is determined with Equation 11, and the construction of the first tunable load 202 is determined using the determined $\Gamma_1$, the interference Interference_Out$_1$ (as experienced by the second transceiver 208 (the victim)) is reduced or cancelled. Similarly, when $\Gamma_2$ of the second tunable load 204 is determined with Equation 12, and the construction of the second tunable load 204 is determined using the determined $\Gamma_2$, interference Interference_Out$_2$ (as experienced by the second transceiver 208 (the victim)) is reduced or cancelled. When the first tunable load 202 is constructed based on the determined $\Gamma_1$, the first tunable load 202 reflects a portion of the interferences transmitted from antenna port $P_1$ of the first transceiver 206 (the interferer) to cancel or reduce the net interference out of antenna port $P_1$. When the second tunable load 204 is constructed based on the determined $\Gamma_2$, the second tunable load 204 reflects a portion of the interferences transmitted from antenna port $P_2$ of the first transceiver 206 (the interferer) to cancel or reduce the net interference out of antenna port $P_2$.

Figure 3:
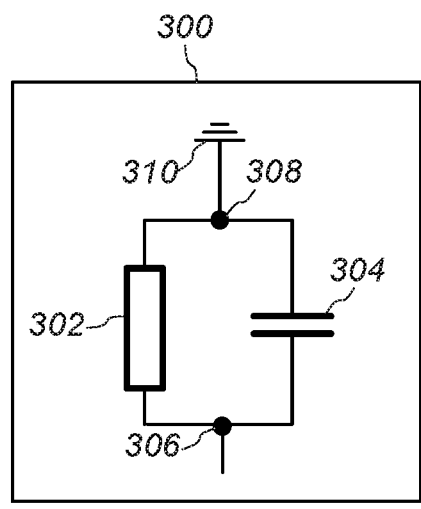
FIG. 3 illustrates a first example of a load that is suitable for use in the embodiment shown in FIG. 2.

FIG. 3 illustrates a first example of a tunable load 300 that is suitable for use in the device 200 shown in FIG. 2. The first tunable load 202 (FIG. 2) and/or the second tunable load 204 (FIG. 2) can be implemented as the tunable load 300.

The tunable load 300 includes a resistor 302 and a capacitor 304 connected in parallel between input node 306 and output node 308. In the example tunable load 300, the output node 308 is connected to ground 310. The resistance value of the resistor 302 and the capacitance value of the capacitor 304 are determined or calculated based on the r that is determined for the tunable load 300. As discussed earlier, the tunable load 300 will reflect a portion of the interferences transmitted by an interfering transceiver to cancel or reduce other existing interferences when the tunable load 300 is constructed based on the determined $\Gamma_1$.

Figure 4:
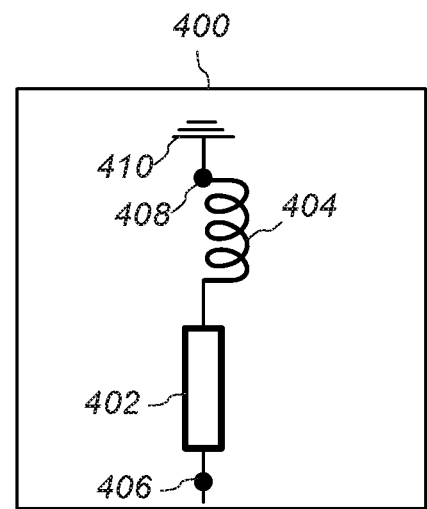
FIG. 4 illustrates a second example of a load that is suitable for use in the embodiment shown in FIG. 2.

FIG. 4 illustrates a second example of a tunable load 400 that is suitable for use in the device 200 shown in FIG. 2. Like with FIG. 3, the first tunable load 202 (FIG. 2) and/or the second tunable load 204 (FIG. 2) may be implemented as the tunable load 400. The tunable load 400 includes a resistor 402 and an inductor 404 connected in series between input node 406 and output node 408. In the example tunable load 400, the output node 408 is connected to ground 410. The resistance value of the resistor 402 and the inductance value of the inductor 404 can be determined or calculated based on the $\Gamma$ that is determined for the tunable load 400. The tunable load 400 will reflect a portion of the interferences transmitted from an interfering transceiver to cancel or reduce the other existing interferences when the tunable load 400 is constructed based on the determined $\Gamma_2$.

Other embodiments can implement a tunable load with different configurations and/or with different components. For example, the resistor 302 and the capacitor 304 in FIG. 3 can be connected in series between the input node 306 and the output node 308 instead of in parallel. Additionally or alternatively, the resistor 402 and the inductor 404 in FIG. 4 can be connected in parallel between the input node 406 and the output node 408 instead of in series. Those skilled in the art will recognize that a tunable load can be constructed with components other than what is shown in FIGS. 3 and 4.

Figure 5:
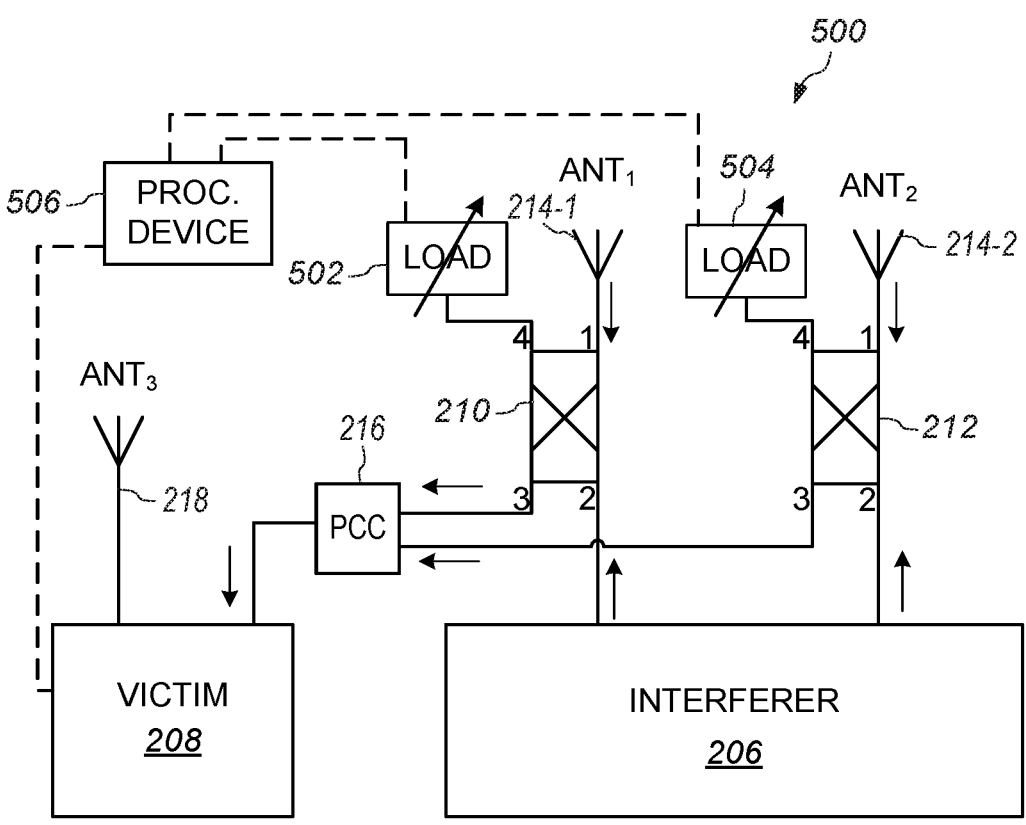
FIG. 5 illustrates a block diagram of a second device that includes a first transceiver that operates with multiple antennas and includes directional couplers and tunable loads to mitigate interference experienced by a co-located second transceiver.

FIG. 5 illustrates a block diagram of a second device 500 that includes the first and second directional couplers 210, 212 and first and second tunable loads 502, 504 to mitigate interference experienced by the co-located second transceiver 208 (the victim). The device 500 is similar to the device 200 shown in FIG. 2 in that the device 500 includes the first transceiver 206 (the interferer) operably connected to the first and the second directional couplers 210, 212, the second transceiver 208 (the victim), the power combiner circuit 216 operably connected between the second transceiver 208 (the victim) and the first and the second directional couplers 210, 212, and the first and second tunable loads 502, 504 operably connected to ports 4 of the first and the second directional couplers 210, 212, respectively. The first and the second tunable loads 502, 504 are each implemented as variable loads.

In some instances, the electromagnetic environment changes as the device 500 moves within an environment and/or as electromagnetic objects in the environment move with respect to the device 500 within the environment (e.g., move closer to or farther from the device 500). For example, the device 500 may be placed on a metallic object, such as a metal desk. Alternatively, the device 500 can move from inside a building to the outdoors. In both examples, the electromagnetic environment around the device 500 changes. Changes in the electromagnetic environment may cause changes to the reflection coefficients $\Gamma_{ant1}$ and/or $\Gamma_{ant2}$ of the first and the second antennas 214-1, 214-2. The first and the second tunable loads 502, 504 can be adjusted dynamically (e.g., in real-time or in substantially real-time) based on changes to the antenna reflection coefficients $\Gamma_{ant1}$ and $\Gamma_{ant2}$ (e.g., based on the amount of cancellation or reduction of the interferences). Adjustments to the first and/or the second tunable loads 502, 504 changes the amount of interference that is reflected by the tunable loads 502, 504, which in turn adjusts the amounts of interferences that are cancelled or reduced.

A processing device 506 may be operably connected to the second transceiver 208 (the victim) and the first and the second tunable loads 502, 504. The processing device 506 can monitor the reduction or cancellation of interferences in the signals received from the output of the power combiner circuit 216 (which effectively monitors the reflection coefficients $\Gamma_1$ and $\Gamma_2$) and cause the values of the first and/or the second tunable loads 502, 504 to change in response to changes in the reduction or cancellation of interferences. In one embodiment, the processing device 506 is the processing device 902 shown in FIG. 9.

In one non-limiting nonexclusive embodiment, one or both of the tunable loads 502, 504 are configured as the tunable load 300 shown in FIG. 3, with the resistor 302 configured as a variable resistor. The resistance of the variable resistor 302 may be adjusted in real-time or in substantially real-time to "tune" the resistance to an adjusted value to better reduce or cancel interferences. Additionally or alternatively, the capacitor 304 shown in FIG. 3 can be a variable capacitor, and the capacitance of the variable capacitor can be adjusted in real-time or in substantially real-time to "tune" the capacitance to an adjusted value to better reduce or cancel interferences.

In another non-limiting nonexclusive embodiment, one or both of the tunable loads 502, 504 are configured as the tunable load 400 shown in FIG. 4, with the resistor 402 implemented as a variable resistor whose resistance may be adjusted in real-time or in substantially real-time to "tune" the resistance to an adjusted value to better reduce or cancel interferences. Additionally or alternatively, the inductor 404 shown in FIG. 4 can be a variable inductor, and the inductance of the variable inductor may be adjusted in real-time or in substantially real-time to "tune" the inductance to an adjusted value to better reduce or cancel interferences.

Figure 6:
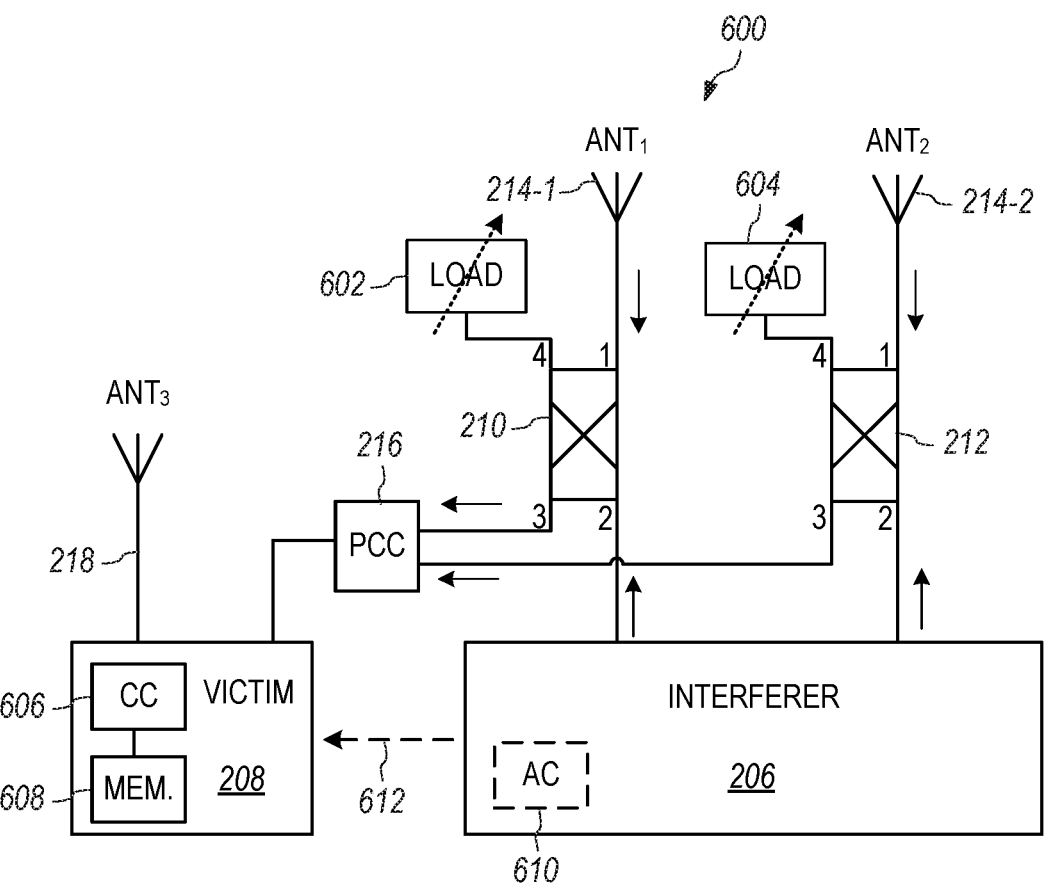
FIG. 6 illustrates a block diagram of a third device that includes a first transceiver that operates with multiple antennas and includes directional couplers and tunable loads to mitigate interference experienced by a co-located second transceiver.

FIG. 6 illustrates a block diagram of a third device 600 that includes the first and second directional couplers 210, 212 and first and second tunable loads 602, 604 to mitigate interference experienced by the co-located second transceiver 208 (the victim). The device 600 is similar to the device 200 shown in FIG. 2 in that the device 600 includes the first transceiver 206 (the interferer) operably connected to the first and the second directional couplers 210, 212, the second transceiver 208 (the victim), the power combiner circuit 216 operably connected between the second transceiver 208 (the victim) and the first and the second directional couplers 210, 212, and the first and second tunable loads 602, 604 operably connected to the first and the second directional couplers 210, 212, respectively. The first and the second tunable loads 602, 604 can each be implemented as tunable loads (e.g., tunable loads 202, 204 in FIG. 2) or as variable loads (e.g., variable loads 502, 504 in FIG. 5).

The second transceiver 208 (the victim) includes a control circuit 606 that is operable to determine a signal quality of a signal received from the third antenna 218 and a signal received from the power combiner circuit 216, and determine whether the second transceiver 208 (the victim) receives and processes the signal from the third antenna 218 or from the power combiner circuit 216 (e.g., signals from the first and the second antennas 214-1, 214-2). For example, a signal received by the third antenna 218 may have better signal quality (e.g., a higher signal-to-interference ratio) compared to a signal received from the power combiner circuit 216. The control circuit 606 is operable to select the antenna port associated with the third antenna 218 to receive the signal (e.g., antenna port $P_1$ in FIG. 2). Alternatively, in some instances, the signal received by the third antenna 218 may be degraded by interference and the signal received from the power combiner circuit 216 may have the better signal quality (e.g., a higher signal-to-interference ratio). For example, the first transceiver 206 (the interferer) can be transmitting signals that radiate from the first and/or the second antennas 214-1, 214-2 and interfere with and degrade the signal received by the third antenna 218. Accordingly, in this latter situation, the control circuit 606 may select the antenna port associated with the power combiner circuit 216 to receive the signal (e.g., the antenna port $P_2$ in FIG. 2). Alternatively, the control circuit 606 may use maximal ratio combining or other diversity technique to receive the signal.

The control circuit 606 can be any suitable type of control circuit, such as a processing device that executes computer-readable instructions that cause the control circuit 606 to select an antenna port to receive a signal (e.g., antenna port $P_1$ or antenna port $P_2$ in FIG. 2). The computer-readable instructions can be stored in a memory 608 that is operably connected to the control circuit 606. Example processing devices include, but are not limited to, application-specific integrated circuit (ASIC), an application processor, a field programmable gate array (FPGA), or any other type of processing device. Additionally, the memory 608 can be any suitable type of memory, such as a non-volatile memory. In one embodiment, the control circuit 606 is the processing device 902 shown in FIG. 9 and the memory 608 is the mass storage 904 shown in FIG. 9.

In some instances, the first transceiver 206 (the interferer) includes an alert circuit (AC) 610 that is operable to send a signal 612 alerting the second transceiver 208 (the victim) as to the transmission state of the first transceiver 206. For example, the alert circuit 610 can set a signal level of the signal 612 to a particular level (e.g., a high signal level) that indicates the first transceiver 206 (the interferer) is transmitting through the first and/or the second antenna 214-1, 214-2. The signal 612 can be sent via a wired or wireless connection. The control circuit 606 may determine, based on the signal 612, to select the antenna port associated with the third antenna 218 or the antenna port associated with the power combiner circuit 216 to receive a signal.

Figure 7:
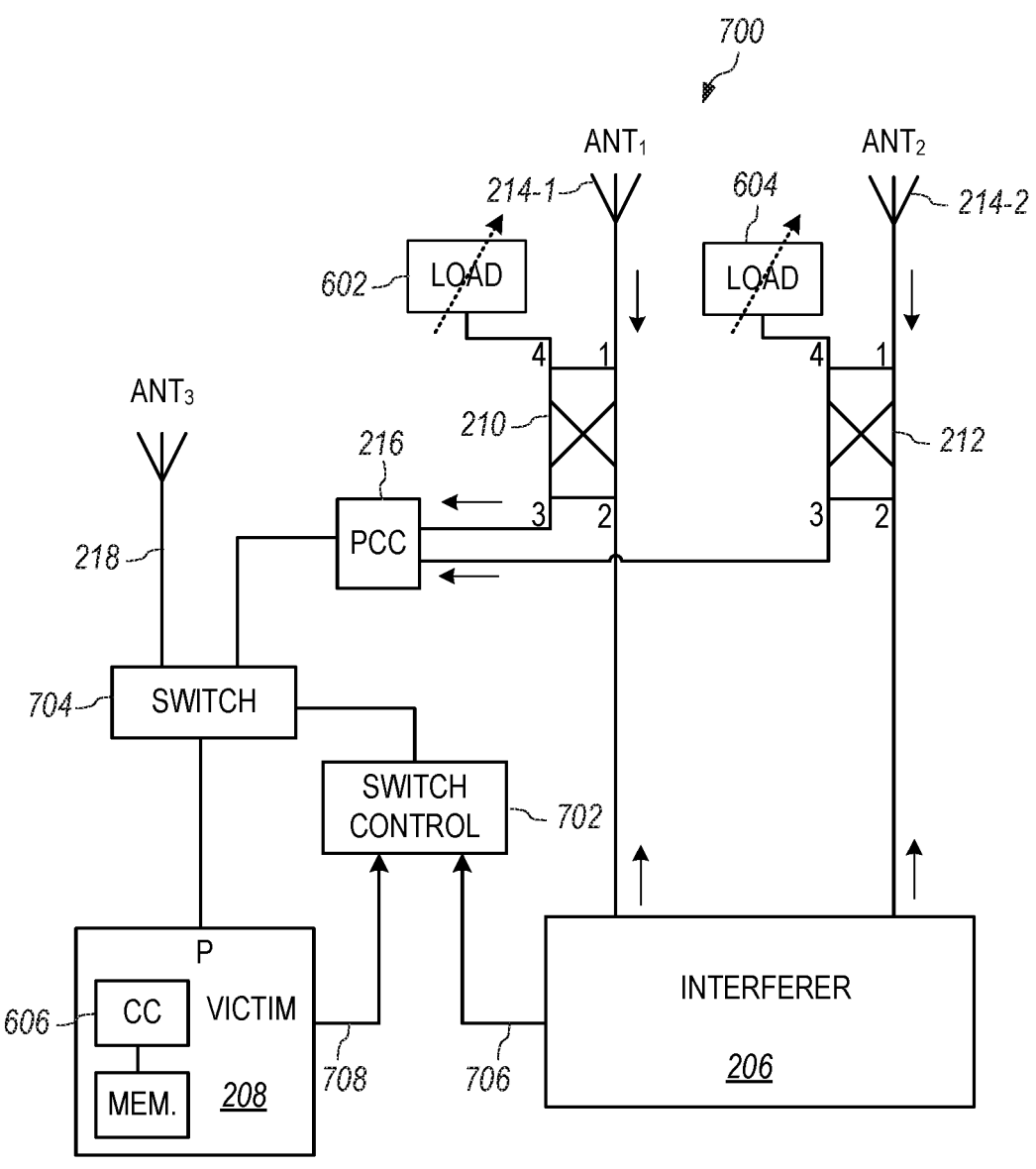
FIG. 7 illustrates a block diagram of a fourth device that includes a first transceiver that operates with multiple antennas and includes directional couplers and tunable loads to mitigate interference experienced by a co-located second transceiver.

FIG. 7 illustrates a block diagram of a fourth device 700 that includes the directional couplers 210, 212 and the tunable loads 602, 604 to mitigate interference experienced by the co-located second transceiver 208 (the victim). The device 700 is similar to the device 200 shown in FIG. 2 in that the device 700 includes the first transceiver 206 (the interferer) operably connected to the first and the second directional couplers 210, 212, the second transceiver 208 (the victim), the power combiner circuit 216 operably connected between the second transceiver 208 (the victim) and the first and the second directional couplers 210, 212, and the first and second tunable loads 602, 604 operably connected to the first and the second directional couplers 210, 212, respectively.

A switch control circuit 702 is operably connected to the first transceiver 206 (the interferer) and to the second transceiver 208 (the victim). A switch 704 is operably connected to an antenna port (P) of the second transceiver 208 (the victim), to the switch control circuit 702, to the third antenna 218, and to the power combiner circuit 216. The first transceiver 206 (the interferer) can send a transmit flag signal 706 (e.g., a transmit notification signal) to the switch control circuit 702 via a wired or wireless connection. The control circuit 606 in the second transceiver 208 (the victim) may send a receive flag signal 708 (e.g., a receive notification signal) to the switch control circuit 702. Based on the received transmit and receive flag signals 706, 708, the switch control circuit 702 causes the switch 704 to switch between the third antenna 218 and the power combiner circuit 216. This arrangement may be appropriate when the second transceiver 208 (the victim) only has one antenna port (P) but would still benefit from the present disclosure. Such situations may occur, for example, in BLUETOOTH Low Energy (BLE) transceivers. Alternatively, the switch control circuit 702 may be eliminated and the control circuit 606 may control the switch 704.

Figure 8:
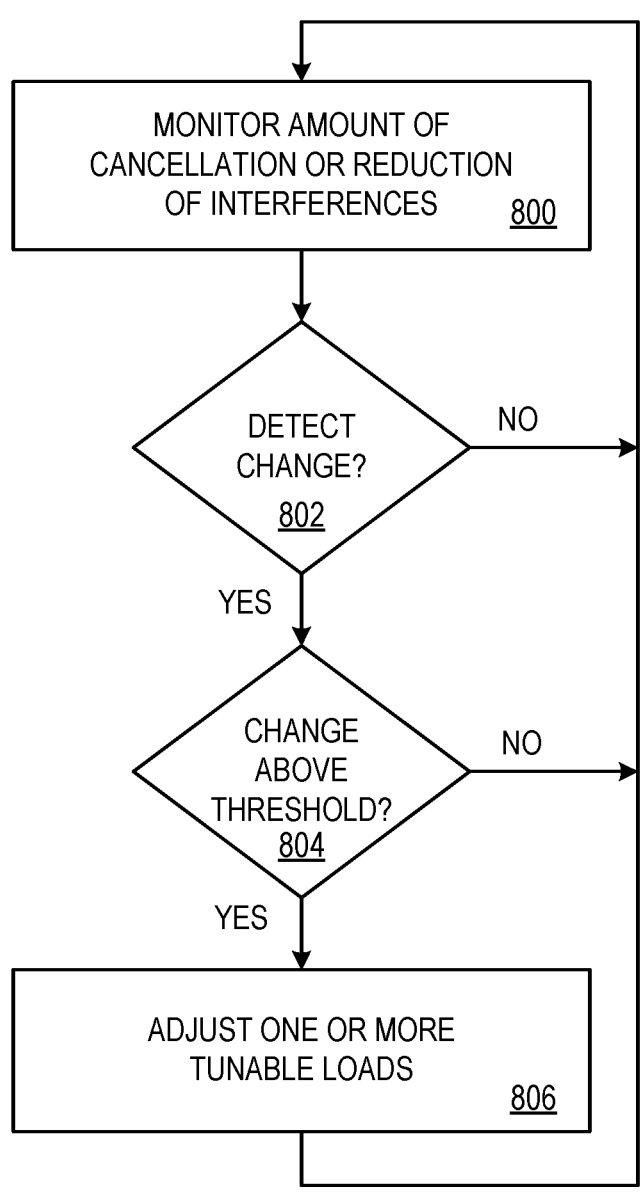
FIG. 8 illustrates a flowchart of a method of operating a device that includes tunable loads that are implemented as variable loads.

FIG. 8 illustrates a flowchart of a method of operating a device that includes tunable loads that are implemented as variable loads. In a non-limiting non-exclusive example, the method of FIG. 8 is performed by the processing device 506 in FIG. 5. Initially, as shown in block 800, the cancellation or the reduction of interferences at the receiving transceiver is detected or monitored. The interferences are incurred by a transmission of a signal at a transmitting transceiver that is co-located to the receiving transceiver. The cancellation or the reduction of interferences may be detected or monitored continuously or at select times.

A determination is made at block 802 as to whether a change in the cancellation or the reduction of interferences is detected (e.g., a change in the net interference). When a determination is made at block 802 that a change has occurred in the cancellation or the reduction of interferences, the method passes to block 804 where a determination is made as to whether the change is equal to or above a threshold value. When a determination is made at block 804 that the change is equal to or above the threshold value, the method passes to block 806 where one or more tunable loads are adjusted to improve the cancellation or the reduction of interferences. The one or more tunable loads are adjusted to change (e.g., to further reduce or cancel) the net interference input into the receiving transceiver. If a determination is made at block 802 that a change has not occurred in the cancellation or the reduction of interferences, or if a determination is made at block 804 the change is below the threshold value (e.g., not equal to or above the threshold value), the method returns to block 800.

Other embodiments are not limited to the blocks shown in FIG. 8. In a non-limiting non-exclusive embodiment, block 804 may be omitted and the method flows from block 802 to block 806.

Figure 9:
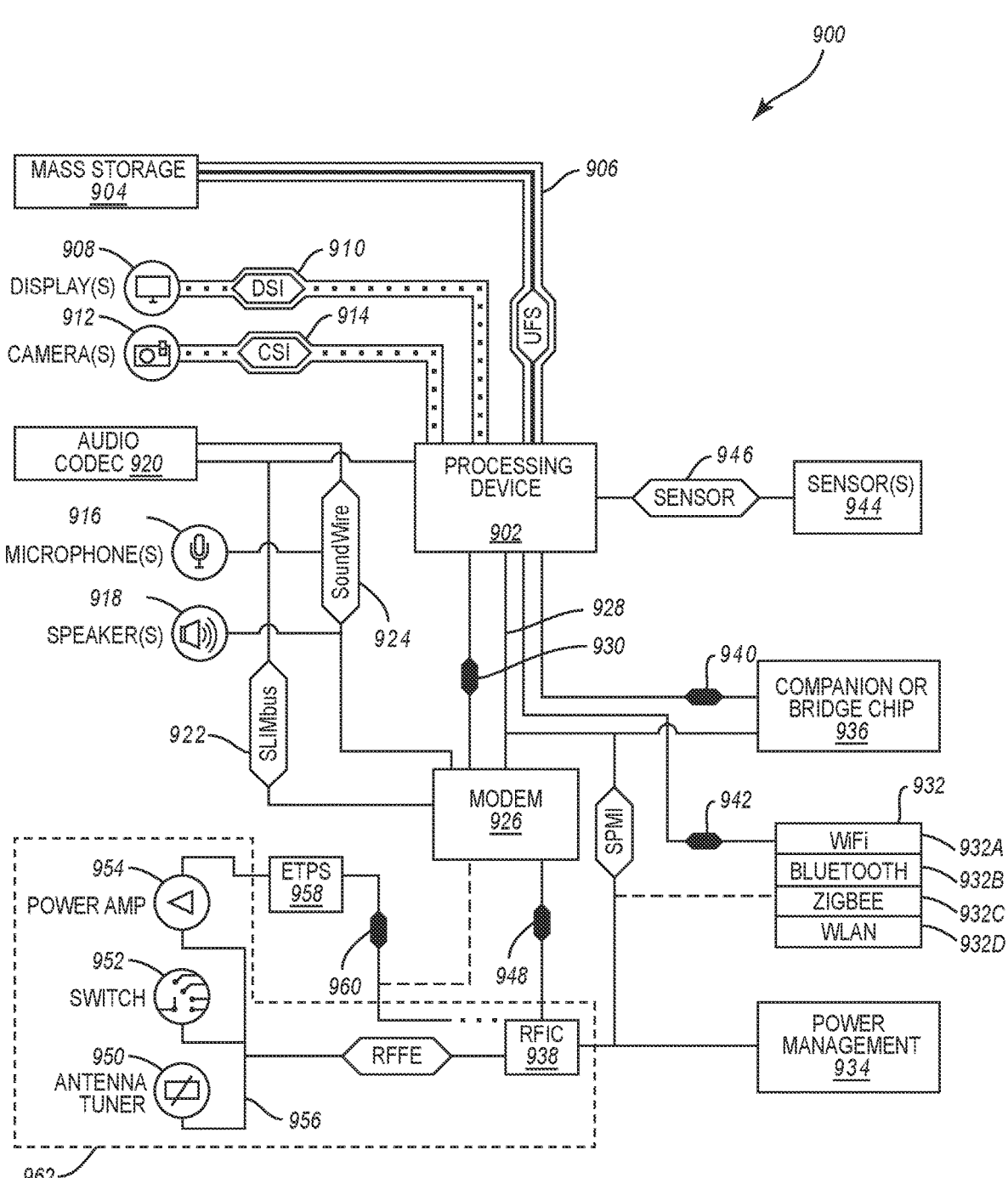
FIG. 9 illustrates a block diagram of a wireless communication device that includes co-located transceivers.

FIG. 9 illustrates a block diagram of a wireless communication device that includes co-located transceivers. As noted above, the present disclosure is suitable for use in any electronic device that is operable to transmit, or transmit and receive, wireless signals using two or more antennas. In non-limiting nonexclusive examples, the electronic device is a mobile communication device. In this regard, FIG. 9 is a system-level block diagram of an example mobile terminal 900 such as a smart phone, mobile computing device (e.g., tablet), or the like. The mobile terminal 900 includes one or more processing devices (collectively referred to as processing device 902) that are operably connected to and communicate with one or more mass storage devices (collectively referred to as mass storage device 904) through a universal flash storage (UFS) bus 906. The mass storage device 904 stores computer-readable instructions that, when executed by the processing device 902, cause operations described herein to be performed. The processing device 902 can be any suitable type of processing device. For example, the processing device 902 may be an application processor and/or a microprocessor. The mass storage device(s) 904 can be any suitable type of non-transitory processor-readable memory, such as a solid-state memory (e.g., a NAND Flash memory).

The processing device 902 is operably connected to one or more displays 908 through a display serial interface (DSI) bus 910 and one or more cameras 912 through a camera serial interface (CSI) bus 914. Various audio elements such as one or more microphones 916, speaker(s) 918, and an audio codec 920 are operably connected to the processing device 902 through a serial low-power interchip multimedia bus (SLIMbus) 922. Additionally or alternatively, the audio elements communicate with each other through a SOUND-WIRE bus 924.

A modem 926 is also operably connected to the SLIMbus 922 and/or the SOUNDWIRE bus 924. The modem 926 may further be operably connected to the processing device 902 through a peripheral component interconnect (PCI) or PCI express (PCIe) bus 928 and/or a system power management interface (SPMI) bus 930.

The SPMI bus 930 is also operably connected to wireless transceivers 932 such as a WI-FI 932A, BLUETOOTH 932B, ZIGBEE 932C, or other local area network (LAN or WLAN) integrated circuit(s) (IC(s)) (LAN IC or WLAN IC) 932D, a power management IC (PMIC) 934, a companion IC (sometimes referred to as a bridge chip) 936, and a radio frequency IC (RFIC) 938. It should be appreciated that separate PCI buses 940, 942 may also be operably connected the processing device 902, to the companion IC 936, and to the WLAN IC(s) 932D. The processing device 904 is also operably connected to one or more sensors 944 through a sensor bus 946. The modem 926 and the RFIC 938 may communicate using a bus 948.

The RFIC 938 is operably connected to one or more radio frequency front end (RFFE) elements, such as an antenna tuner 950, a switch 952, and a power amplifier 954 through a RFFE bus 956. Additionally, the RFIC 938 operably connects to an envelope tracking power supply (ETPS) 958 through a bus 960, and the ETPS 958 may communicate with the power amplifier 954. Collectively, the RFFE elements, including the RFIC 938, may be considered an RFFE system 962. It should be appreciated that the RFFE bus 956 may be formed from a clock line and a data line (not illustrated). The RFFE system 962 is operably connected to N antennas, where N is equal to or greater than two.

The mobile terminal 900 represents one example of a mobile terminal. Other embodiments can include additional or different components, and/or omit one or more components shown in FIG. 9. Additionally, while the discussion of example aspects of the present disclosure focuses on the mobile terminal context, it should be appreciated that the present disclosure is not so limited. For example, a gateway or a set-top box that has multiple transceivers may also benefit from the present disclosure.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A system, comprising:

a first transceiver;

a first directional coupler operably connected to the first transceiver; a first antenna operably connected to the first directional coupler;

a first tunable load operably connected to the first directional coupler;

a second directional coupler operably connected to the first transceiver;

a second antenna operably connected to the second directional coupler; a second tunable load operably connected to the second directional coupler;

a second transceiver co-located to the first transceiver, the second transceiver operably connected to the first directional coupler and the second directional coupler; and a power combiner circuit operably connected between the second transceiver and the first and the second directional couplers, wherein the first tunable load and the second tunable load are tuned to at least reduce interference that is incurred by a transmission of a signal on the first antenna.

2. The system of claim 1, further comprising a third antenna operably connected to the second transceiver.

3. The system of claim 2, wherein the second transceiver further comprises a control circuit configured to select between receiving a signal from the third antenna or the power combiner circuit.

4. The system of claim 1, further comprising:

a third antenna;

a switch control circuit operably connected to the first transceiver and the second transceiver; and a switch coupled to the switch control circuit and operable to be operably connected to the third antenna or the power combiner circuit, wherein the switch control circuit is configured to control the switch.

5. The system of claim 4, wherein the first transceiver is operable to send a transmit notification signal to the switch control circuit prior to transmitting.

6. The system of claim 5, wherein the second transceiver is operable to send a receive notification signal to the switch control circuit prior to receiving.

7. The system of claim 1, wherein the first tunable load and the second tunable load each comprises a variable load.

8. The system of claim 7, further comprising:

a processing device operably connected to the first and the second variable loads; and a memory operably connected to the processing device and storing instructions, that when executed by the processing device, cause the processing device to adaptively adjust at least the first variable load or the second variable load as responsive to changes in environment.

9. The system of claim 1, wherein the system comprises a cellular telephone.

10. The system of claim 1, wherein the first transceiver is operable to send a transmit notification signal to the second transceiver prior to transmitting.

11. The system of claim 1, wherein the first tunable load and the second tunable load each comprise a resistor and a capacitor connected in parallel.

12. The system of claim 1, wherein the first tunable load and the second tunable load each comprise a resistor and an inductor connected in series.

13. A device comprising: a first transceiver;

a first directional coupler operably connected to the first transceiver;

a first antenna operably connected to the first directional coupler;

a first tunable load operably connected to the first directional coupler;

a second directional coupler operably connected to the first transceiver; a second antenna operably connected to the second directional coupler; a second tunable load operably connected to the second directional coupler;

a second transceiver co-located to the first transceiver, the second transceiver operably connected to the first directional coupler and the second directional coupler, wherein the first tunable load and the second tunable load are tuned to at least reduce interference that is incurred by a transmission of a signal on the first antenna; and a power combiner circuit operably connected between the second transceiver and the first and second directional couplers.

14. The device of claim 13, wherein the first transceiver comprises a wireless fidelity (WI-FI) transceiver.

15. The device of claim 13, wherein the second transceiver comprises at least one of a BLUETOOTH or Zigbee transceiver.

16. The device of claim 13, wherein the first tunable load and the second tunable load each comprise a resistor and a capacitor connected in parallel.

17. The device of claim 13, wherein the first tunable load and the second tunable load each comprise a resistor and an inductor connected in series.

18. The device of claim 13, wherein the first tunable load is a variable load.

19. The device of claim 18, wherein the variable load is operable to be adaptively tuned to be responsive to changes in environment.

20. The device of claim 13, wherein the second tunable load is a variable load.

21. The device of claim 20, wherein the variable load is operable to be adaptively tuned as responsive to changes in environment.

22. The device of claim 13, wherein the device comprises a mobile communication device.

23. The device of claim 13, wherein the device comprises a set-top box.

24. A method comprising:

detecting an amount of reduction of interferences at a receiving transceiver, the interferences incurred by a transmission of a signal on at least one of multiple antennas of a transmitting transceiver that is co-located to the receiving transceiver;

determining whether the amount of the reduction of interferences is changed;

prior to adjusting at least one variable load, determining whether the change in the amount of reduction of interferences is above a threshold value;

based on a determination that the amount of the reduction of interferences has changed and based on a determination that the change in the amount of reduction of interferences is above the threshold value, adjusting the variable load to change a net interference input into the receiving transceiver, wherein the variable load is operably connected to a directional coupler and the directional coupler is operably connected to the receiving and the transmitting transceivers.

* * * * *